US011506373B2

(12) United States Patent
Nichols

(10) Patent No.: US 11,506,373 B2
(45) Date of Patent: Nov. 22, 2022

(54) COOLED LIGHTING SYSTEM

(71) Applicant: AVID Labs, LLC, Fort Wayne, IN (US)

(72) Inventor: Joel A. Nichols, Columbia City, IN (US)

(*) Notice: Subject to any disclaimer, the term of this patent is extended or adjusted under 35 U.S.C. 154(b) by 0 days.

(21) Appl. No.: 17/095,851

(22) Filed: Nov. 12, 2020

(65) Prior Publication Data
US 2021/0140618 A1 May 13, 2021

Related U.S. Application Data

(60) Provisional application No. 62/934,790, filed on Nov. 13, 2019.

(51) Int. Cl.
F21V 29/50 (2015.01)
F21V 21/088 (2006.01)
A01G 9/24 (2006.01)
A01G 7/04 (2006.01)

(52) U.S. Cl.
CPC .............. F21V 29/50 (2015.01); A01G 7/045 (2013.01); A01G 9/247 (2013.01); A01G 9/249 (2019.05); F21V 21/088 (2013.01)

(58) Field of Classification Search
CPC ........ F21V 29/50; F21V 21/088; F21V 29/51; A01G 9/249; A01G 7/045; A01G 7/247
See application file for complete search history.

(56) References Cited

U.S. PATENT DOCUMENTS

| 8,651,704 | B1* | 2/2014 | Gordin | F21V 33/0092 |
| | | | | 362/294 |
| 8,789,973 | B2* | 7/2014 | Li | F21V 29/59 |
| | | | | 362/294 |
| 10,738,990 | B2* | 8/2020 | Holmes | F21V 29/56 |
| 2005/0268547 | A1* | 12/2005 | Uchiyama | A01G 7/045 |
| | | | | 47/64 |
| 2020/0386393 | A1* | 12/2020 | Dieser | A01G 9/249 |

FOREIGN PATENT DOCUMENTS

WO WO-2010140171 A1 * 12/2010 .............. F21V 29/75

* cited by examiner

Primary Examiner — Arman B Fallahkhair

(57) ABSTRACT

A lighting system includes a plurality of lighting fixtures coupled to a cooling pipe, each lighting fixture having an open sided pipe coupling portion and a lighting member connected to the coupling portion. The lighting member being thermally coupled to an inside portion of the pipe coupling portion. The lighting member having a light emanating away from the cooling pipe.

11 Claims, 2 Drawing Sheets

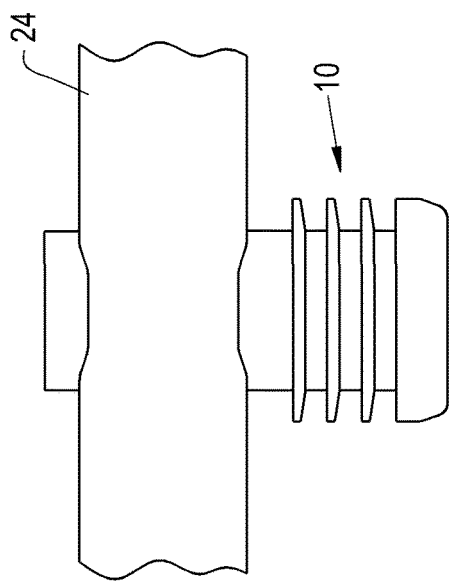
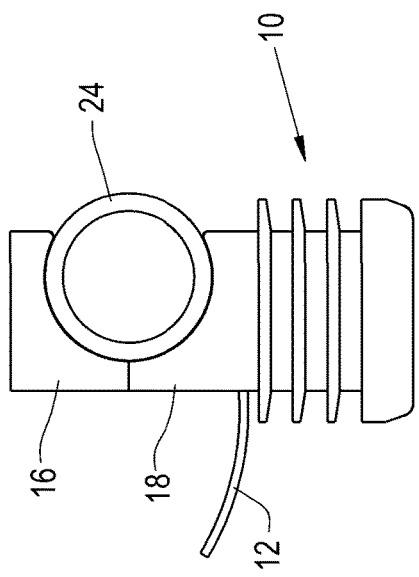
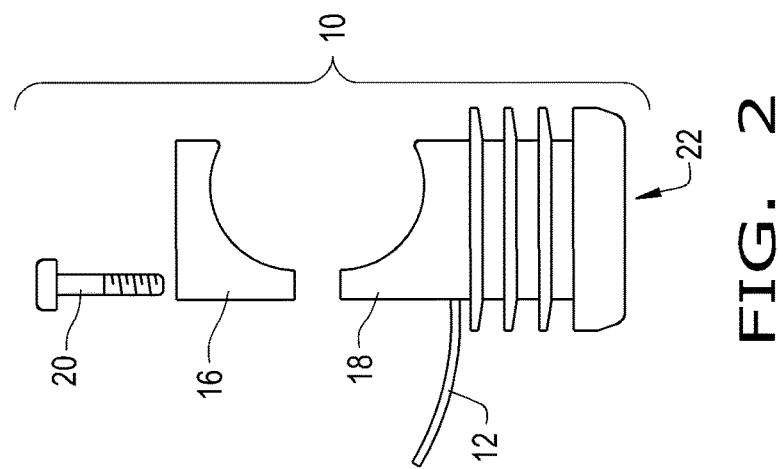
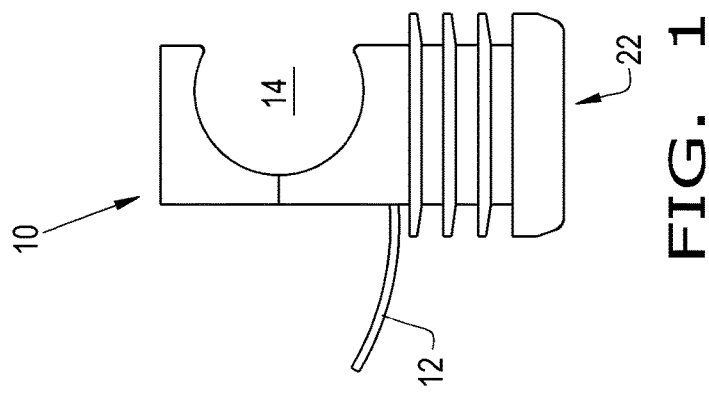

COOLED LIGHTING SYSTEM

CROSS REFERENCE TO RELATED APPLICATIONS

This is a non-provisional application based upon U.S. provisional patent application Ser. No. 62/934,790 entitled "COOLED LIGHTING SYSTEM", filed Nov. 13, 2019, which is incorporated herein by reference.

BACKGROUND OF THE INVENTION

1. Field of the Invention

The present invention relates to a lighting system that provides a high intensity of light and is cooled by way of a connection with its mounting feature.

2. Description of the Related Art

High intensity lighting is needed in particular applications, such as for use in plant raising facilities, such as a greenhouse. High intensity efficient lighting by way of light emitting diodes (LEDs), even though very efficient still produces waste heat, which needs to be conducted away from the LED to prevent degradation and failure of the LED.

LEDs were not always so robust when they were developed in 1962. The earliest LEDs emitted low-intensity infrared light and were often used in remote-control circuits, such as those used with a wide variety of consumer electronics. The first visible-light LEDs were of low intensity and limited to red, often used as indicator lamps, replacing small incandescent bulbs, and in seven-segment displays. Over the years LED development has lead to high-output white light LEDs suitable for room and outdoor area lighting.

LEDs have many advantages over incandescent light sources, including lower energy consumption, longer lifetime, improved physical robustness, smaller size, and faster switching. LEDs are used in applications as diverse as aviation lighting, automotive headlamps, advertising, general lighting, traffic signals, camera flashes, lighted wallpaper, horticultural grow lights, and medical devices.

Several structure considerations come into play when manufacturing LEDs, with some tradeoffs being made in order to produce light that meets the spectral characteristics needed for plant growth, or simply to produce light that is pleasing to the human eye, and which renders color better. The structural tradeoffs in the LED impact the heat produced by the LED and there is a need to dissipate the heat by conducting the heat away from the LED to allow the LED to produce a desired intensity of light. The conduction of heat from the LED leads to prolonged efficient use of the LED.

What is needed in the art is a way to provide high intensity lighting in an environment that has an installed cooling system or an irrigation system, thereby reducing the need for internal heat dissipating techniques in the lighting fixture itself, for reduced cost of the lighting fixture.

SUMMARY OF THE INVENTION

Embodiments of the present invention are directed to a lighting system associated with high intensity lighting that requires cooling.

The invention in one form is directed to a lighting system that includes a plurality of lighting fixtures coupled to a cooling pipe, each lighting fixture having an open sided pipe coupling portion and a lighting member connected to the coupling portion. The lighting member being thermally coupled to an inside portion of the pipe coupling portion. The lighting member having a light emanating away from the cooling pipe.

The invention in another form is directed to a lighting fixture for use in a greenhouse lighting system, the greenhouse having an irrigation pipe. The lighting fixture includes an open sided irrigation pipe coupling portion. A lighting member is connected to the coupling portion, the lighting member being thermally coupled to an inside portion of the pipe coupling portion. The lighting member having a light emanating away from the irrigation pipe coupling portion.

Advantageously, the present invention provides a lighting system that easily couples to a cooling pipe.

Additional features and advantages of the invention will be made apparent from the following detailed description of illustrative embodiments that proceeds with reference to the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 is a side view of an embodiment of a light fixture of the present invention;

FIG. 2 is an exploded view of the light fixture of FIG. 1;

FIG. 3 is a side view of the light fixture of FIGS. 1 and 2 attached to a pipe;

FIG. 4 is another side view of the light fixture of FIGS. 1-3 attached to a pipe;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 5:
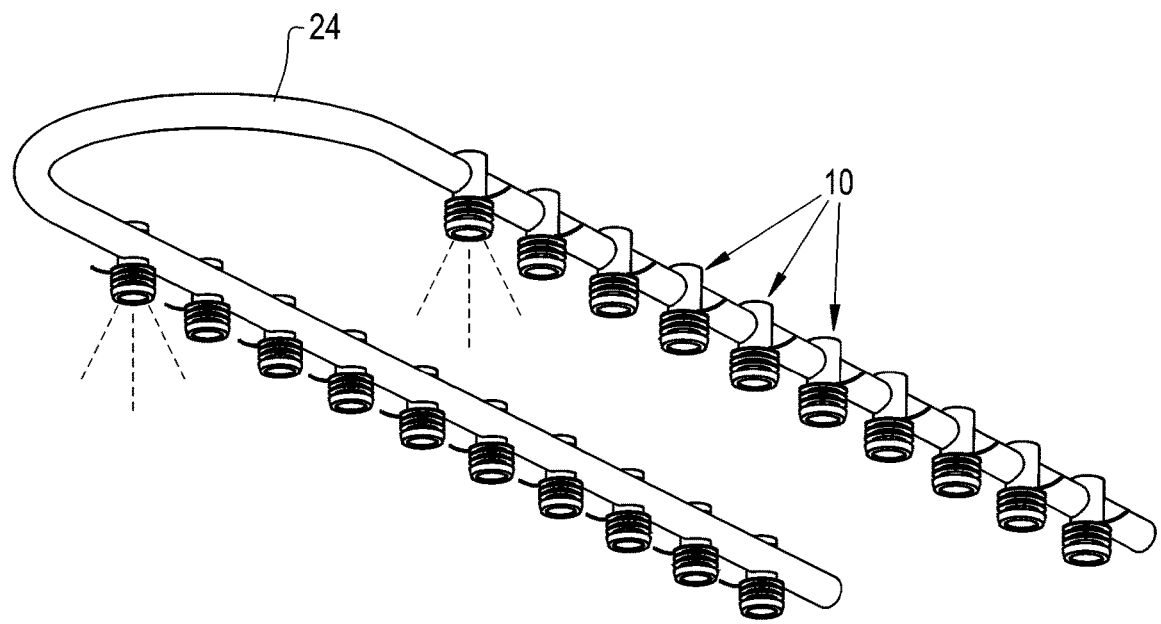
FIG. 5 is a perspective view of many light fixtures of FIGS. 1-4 arranged on a pipe to form an embodiment of a lighting system.

Referring now to the drawings, and more particularly to FIG. 1, there is shown, a side view of a light fixture 10 having an electrical connection 12, in the form of wiring 12, and a clamping area 14. Referring to FIG. 2 there is shown light fixture 10 in an exploded view, in which upper portion 16 and lower portion 18 are shown along with a screw 20. Light fixture 10 is designed to produce a large amount of light for the growing of plants. The intensity of the light emanating from light fixture 10 is such that cooling of the light producing element 22 is needed.

Now, additionally referring to FIG. 3 there is shown a pipe 24, with light fixture 10 clamped thereto using clamping area 14 to encompass more than half of the circumference of pipe 24. The presence of pipe 24 allows for a transfer of heat from light producing element 22 to thereby allow light producing element 22 to more effectively produce the needed level of light. The thermal coupling from element 22 to pipe 24 is not illustrated, but it is such that the thermal resistance is low effecting efficient heat transfer. Water flowing in pipe 24, perhaps for irrigation purposes, allows for the warming of the water and the cooling of element 22. It is also contemplated that the fluid flow in pipe 24 could be a cooling fluid circulated through pipe 24 just to cool light elements 22.

Now, additionally referring to FIG. 4 there is shown a side view, with pipe 24 shown in cross section to illustrate the clamping of fixture 10 to pipe 24.

Figure 6:
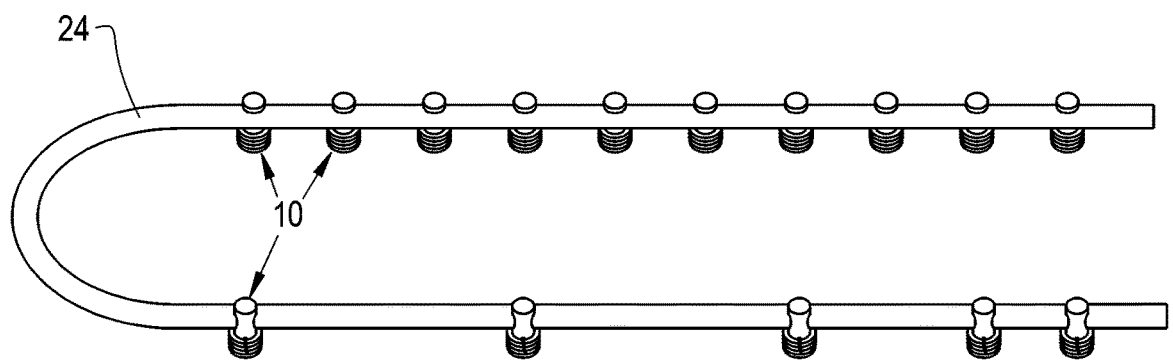
FIG. 6 is another perspective view of the lighting system of FIG. 5 having the light fixtures reconfigured.

Now, additionally referring to FIGS. 5 and 6 there are shown the ease at which the spacing of multiple light fixtures 10 on pipe 24 can be arranged. Although not illustrated light fixtures 10 can be positioned at any rotative angle before screw 20 is tightened to alter the light direction. Light fixtures 10 can be spaced at selected distances along pipe 24.

Advantageously, the present invention serves to keep lighting element 22 cool while pipe 24 carries water in the irrigation system.

FIGS. 5 and 6 illustrate lighting systems that have lighting fixtures 10 coupled to cooling pipe 24, which can be irrigation pipe 24. Each lighting fixture 10 has an open sided pipe coupling portion 16, 18. Lighting member 22 is connected to coupling portion 16, 18, with lighting member 22 is thermally coupled to inside portion 14 of pipe coupling portion 16, 18. The lighting member 22 has light emanating away from cooling pipe 24.

Cooling pipe/water irrigation pipe 24 can be a fluid circulating pipe 24 that conducts heat from light 22 by being thermally conducted by way of first member 18 to pipe 24. Pipe coupling portion 16, 18 has an opening 14 that has a C-shape. Pipe coupling portion 16, 18 extends more than halfway around the cooling pipe 24 when coupled thereto, as can be seen in FIG. 4. Pipe coupling portion 16, 18 includes first element 18 coupled to lighting member 22 and a second element 16 that is detachable from first element 18. Together first element 18 and second element 16 form C-shaped opening 14. First element 18 and second element 16 individually each extend less than halfway around cooling pipe 24. Fastening element 20 connects first element 18 and second element 16. Lighting member 22 has a substantially longitudinal symmetry, as can be seen in the drawings.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A lighting system comprising:
    a plurality of lighting fixtures coupled to a cooling pipe, each lighting fixture including:
        an open sided pipe coupling portion, and
        a lighting member connected to the coupling portion, the lighting member being thermally coupled to an inside portion of the pipe coupling portion, the lighting member having a light emanating away from the cooling pipe; wherein
    the pipe coupling portion includes a first element coupled to the lighting member and a second element that is detachable from the first element;
    the first element and the second element together form a C-shaped opening; and
    the first element and the second element individually each extend less than halfway around the cooling pipe.

2. The lighting system of claim 1, wherein the cooling pipe is a water irrigation pipe.

3. The lighting system of claim 1, wherein the cooling pipe is a fluid circulating pipe.

4. The lighting system of claim 1, wherein the pipe coupling portion extends more than halfway around the cooling pipe when coupled thereto.

5. The lighting system of claim 1, further comprising fastening element that connects the first element and the second element.

6. The lighting system of claim 1, wherein the lighting member having a substantially longitudinal symmetry.

7. A lighting fixture for use in a greenhouse lighting system, the greenhouse having an irrigation pipe, the lighting fixture comprising:
    an open sided irrigation pipe coupling portion; and
    a lighting member connected to the coupling portion, the lighting member being thermally coupled to an inside portion of the pipe coupling portion, the lighting member having a light emanating away from the irrigation pipe coupling portion; wherein
    the pipe coupling portion includes a first element coupled to the lighting member and a second element that is detachable from the first element;
    the first element and the second element together form a C-shaped opening; and
    the first element and the second element individually each are extendable less than halfway around the irrigation pipe.

8. The lighting fixture of claim 7, wherein the irrigation pipe has water flowing therein.

9. The lighting fixture of claim 7, wherein the pipe coupling portion extends more than halfway around the irrigation pipe when coupled thereto.

10. The lighting fixture of claim 7, further comprising a fastening element that connects the first element and the second element.

11. The lighting fixture of claim 7, wherein the lighting member having a substantially longitudinal symmetry.

\* \* \* \* \*